United States Patent Office 3,746,679
Patented July 17, 1973

3,746,679
COATING COMPOSITIONS CONTAINING AQUEOUS DISPERSIONS OF ETHYLENE-VINYL ACETATE COPOLYMERS
John Joseph Seipel, Jr., 346 Euclid Ave., Ambler, Pa. 19002
No Drawing. Continuation-in-part of application Ser. No. 756,408, Aug. 30, 1968. This application May 4, 1971, Ser. No. 140,307
Int. Cl. C08f 45/26
U.S. Cl. 260—29.6 ME          3 Claims

ABSTRACT OF THE DISCLOSURE

General purpose water-based mastic compositions suitable for application and curing at temperatures below the freezing point of water which comprise a uniform aqueous emulsion containing (a) an ethylene vinylacetate copolymer (b) an alkylene glycol solvent (c) a glycol acetate ester or a glycol ester and (d) an alkylaryl polyether alcohol.

---

This application is a continuation-in-part of application Ser. No. 756,408, filed Aug. 30, 1968, now abandoned.

BACKGROUND OF THE INVENTION

Industrial plants, for example chemical processing plants, include equipment, piping and vessels exposed to the atmosphere. Customarily, such equipment, piping and vessels if heated or chilled are provided with a thermal insulation covering made, for example of calcium silicate, fibrous glass or mineral wool for heated equipment and piping, and of cellular glass, fibrous glass or a cellular plastic for cold service. The insulation itself has limited resistance to weathering and necessarily must be given a protective finish, often a specially designed thick coating known in the trade as a "mastic." Mastics generally are semi-fluid materials applied in wet thicknesses of 30 mils and more. Typical mastic finishes may include either water or an organic solvent as a liquefying ingredient in the composition. Each type of formulation has its disadvantages.

Mastic compositions employing water as the liquefying ingredient are usually the emulsion copolymer or latex variety. Below 0° C., these water dispersed formulations become frozen solid and cannot be applied and upon thawing they are no longer useful since the ice crystals formed by freezing of the aqueous phase intrude into the hydrophilic envelope of the protective colloid surrounding the resin particles to disrupt the stability of the latex system and cause coagulation of the polymer particles. If water dispersed formulations are applied at temperatures above freezing and subsequently exposed to freezing before complete evaporation of the water, they are damaged beyond repair and become cracked, spalled or otherwise unsuitable. For these reasons, water-based mastic systems heretofore have not been suitable for application in the construction of industrial plants or buildings where temperatures may drop below 0° C. during the application or curing period which frequently occurs even in temperate zones during winter months. To overcome the problem of freezing temperatures there have been previously used organic solvent-based formulations. These, however, have the disadvantage of thickening at low temperatures, making them difficult to apply. Furthermore, the organic solvent in these formulations can attack certain plastic foam substrates and may also create a fire hazard owing to the flammable nature of the solvent.

Thus far efforts to overcome the drawbacks of water dispersed formulations has been directed primarily toward freeze-thaw stability protection while in the package. This art encompasses the protection of aqueous coatings against repeated cycles of freezing and thawing. Without such protection this exposure would damage the coating composition while still in the container rendering it unusable. The developments in freeze-thaw stable coatings are illustrated by the disclosures in a number of patents which have been granted citing the use of additives to protect the coating composition in the container in the event of exposure to freezing temperatures during storage and shipment. Unless such additives are incorporated the coating compositions will, upon exposure to freezing temperatures, solidify in the container. This art of formulating low-temperature stable aqueous latex compositions has, however, been limited to compositions which, while stable to sub-freezing temperature, are suitable for application only at temperatures well above the freezing point of water, and preferably at temperatures above 40° F. (4° C.). Thus, even though such compositions represent a significant improvement in that special precautions need not be taken to avoid exposure to sub-zero temperatures during shipping and storage, there none-the-less remains the disadvantage that such compositions cannot be applied whenever environmental temperatures during the application and curing period may drop to the freezing temperature of water or lower. Environmental temperatures which are below the freezing point of the aqueous component of a coating composition prevent film coalescence after application because of the formation of ice crystals within the structure of the applied coating. Evaporation of these ice crystals at below freezing temperatures dehydrates the coating without permitting polymer particle mobility and consequent stress relief which normally results in uniform shrinkage in volume on evoporation of water from the applied coating at temperatures above 0° C. The film stresses induced by the absence of polymer particle mobility leave large cracks and voids within the structure of the applied coating and the coagulated latex particles are deposited as a discontinuous agglomeration, without any strength in the dry film.

The physical state of the polymer emulsion (latex) in a normally acceptable coating for outdoor application is such that it will form a continuous uniformly coalesced film at 40° F. (4° C.) and is firm enough to form a non-tacky film after water is evaporated. It has been theorized that normal evaporation of water from an applied coating forms capillary voids in the surface thus initiating film formation. These voids in turn cause compaction of the dispersed particles within the film by pulling them into the voids as more water evaporates. Homogeneous film formation occurs completely if the properties of the polymeric binder are sufficiently viscoelastic to permit deformation and accomplish particle coalescence of the applied film. However, in the usual aqueous coating at below freezing temperatures these polymer particles are not viscoelastic but glass-hard, and coalescence of the film cannot take place. Coalescence aids have only been partially successful in remedying this drawback, since when high levels of coalescing aids are used pigment flocculation, loss of freeze-thaw stability and reduced shelf stability result.

Accordingly, it is an object of this invention to provide a general purpose aqueous mastic coating composition which can form an effective protective coating at temperatures below 0° C. irrespective of whether such temperatures are experienced during application of the coating or during its subsequent drying or both.

BRIEF DESCRIPTION OF THE INVENTION

This invention relates to coating compositions and in particular this invention is concerned with water-dispersed compositions which can be applied at temperatures below 32° F. to form thick protective coatings on industrial plant construction or commercial building components. According to this invention mastic coatings suitable for application at temperatures below the freezing point of water can be formulated with an aqueous copolymer emulsion of a known class of latices in combination with a freeze-thaw stabilizer, a coalescing aid, a non-ionic surface active agent, a fibrous filler and other conventional surface active agent, a fibrous filler and other conventional additives such as pigments, fillers, preservatives, defoamers, fire retardants, fungicides and the like.

DETAILED DESCRIPTION

In particular this invention pertains to mastic coating compositions capable of being applied over an ambient temperature range of about −20° C. to about 50° C. The compositions of this invention are additionally non-Newtonian in flow and thus capable of application in thickness up to ⅛ inch (3.2 mm.) so as to "bridge," fill, and level joints and gaps in the subsurface such as for example thermal insulation. These aqueous coating compositions have a minimum storage life of 6 months, are freeze-thaw stable in the package, and can be made available in a board spectrum of colors. Upon application and drying of the aqueous mastic coating compositions of this invention, there is obtained a coating which is insensitive to water within a minimum reasonable drying time and is resistant to deterioration by weather elements such as rain, sleet, snow, wind, severe temperature changes and solar radiation without cracking, peeling, becoming brittle, blistering or otherwise disintegrating. Furthermore, these compositions adhere to all substrates encountered in coating thermal insulation materials. They are impact-resistant and resistant to exposure to mild industrial acids, alkalies, salts and their vapors, and can be formulated as fire-resistant compositions.

The novel compositions of this invention are prepared by uniformly blending an aqueous emulsion of an ethylene vinylacetate copolymer (acetoxylated polyethylene) with an alkylene glycol freeze-thaw stabilizer, an alkylaryl polyether alcohol non-ionic surface active agent and a glycol ether ester or glycol ether coalescing aid plus sufficient fibrous filler to provide the desired viscosity in the liquid state and reinforcing properties when cured. Other additives may be incorporated as desired to achieve particular effects. For example there can be added pigments and other fillers to vary color and consistency, fire retardants, defoamers, preservatives, fungicides, mildewcides, thickeners or other conventional latex paint additives, being careful to maintain a high solids content in order to have a minimum of free water in the formulation. The combination of an ethylene vinylacetate copolymer, an alkylene glycol, an alkylarylpolyether alcohol and a glycol ether ester or glycol ether in amounts as disclosed herein with fibrous filler to provide a composition having a minimum solids content of greater than 65% and a viscosity of greater than 30,000 centipoises provides a general purpose mastic composition which can be applied and cured at an environmental temperature below the freezing point of water. Since the particularly useful properties of these compositions are dependent upon the critical combination of the above ingredients care must be exercised in the selection and addition of conventional additives so as not to destroy the low temperature utility of these compositions.

While it has been previously known to add freeze-thaw stabilizers to latex paints in order to prevent deterioration of the paint subjected to successive freezing and thawing while in the container, it has not been previously possible to formulate a latex system capable of being applied and cured at temperatures below the freezing point of water. In accordance with this invention it has now been found that certain specific freeze-thaw stabilizers when combined with particular non-ionic surface active agents in a selected mastic polymer emulsion has a greater affinity toward the polymer and less toward the water, as is the case where freeze-thaw stabilizers are ordinarily added to latex paints; thus allowing the release of water and formation of a clean continuous film. The freeze-thaw stabilizer surface active agent combinations of this invention act as a temporary plasticizer for the polymer at low temperatures which mode of action is unlike the usual effect of freeze-thaw stabilizer which will contain the water in the frozen state and on thawing allow the polymer to re-emulsify without coalescing into a homogenous film.

The mastic compositions of this invention having a high solids-low water content and a combination of essential ingredients comprising polymer, freeze-thaw stabilizer, surface active agent, coalescing aid and fibrous filler provides a unique water base mastic capable of application and curing at below freezing temperatures. In and of themselves the separate components are generally recognized as additives for latex paints. In the present formulations, however, it has been found that these conventional additives do not behave conventionally in that they allow the water (solvent) to leave the system at below freezing temperatures so that film formation occurs, that is, the freeze-thaw stabilizing agent, the non-ionic surface active agent and the coalescing aid acting in conjunction as a temporary plasticizer has a greater affinity for the ethylene vinyl acetate copolymer at below freezing temperatures than for the water, allowing the water to vaporize and the copolymer particles to coalesce into a continuous film of tough elastomeric plastic material, containing asbestos reinforcing fibers, pigments and fillers, formed at temperatures below the freezing point of water. Such water based mastic compositions which can be applied and cured at temperatures below the freezing point of water have not been known heretofore. In its broad aspect the novel mastics of this invention, having unique low temperature curing properties as described above are formulated by blending together:

(a) an ethylene vinylacetate copolymer emulsion having about 55% by weight of copolymer and about 45% by weight water with a small amount of surfactant required for the formation of a stable dispersion (latex), (b) an alkylene glycol preferably ethylene glycol freeze-thaw stabilizer, (c) a non-ionic surface active agent, preferably t-octylphenoxypolyhydroxy alcohol (40 moles ethylene oxide per mole of alcohol), (d) a coalescing agent, preferably diethylene glycol monobutyl ether acetate, and (e) a fibrous filler preferably asbestos fibers.

Other optional ingredients which may be desirable but which are not necessary for the preparation of a mastic of the type described herein include: other filler materials and pigments such as $TiO_2$, $CaCO_3$, $Sb_2O_3$, etc.; pigment dispersants and wetting agents; water softeners; dispersing agents; defoamers; fungicides; fire retardants, etc. The mode of selecting the appropriate additives will be more fully described hereinbelow.

The polymers employed in the novel compositions of this invention are emulsion polymers and more particularly they are the internally plasticized copolymers especially the ethylene vinylacetate copolymers. Such copolymers are prepared by emulsion copolymerizing vinylacetate with ethylene by procedures known to the art. Copolymers suitable for the practice of this invention are disclosed for example in an article entitled: "Vinyl Acetate/Ethylene Emulsion Copolymers" appearing at p. 30 of Paint Manufacture, September 1968, and the references cited therein. Those copolymers most suited for the preparation of the novel mastic compositions of this invention are the copolymers of high vinyl acetate content. These copolymers are also commercially available in the form of stable aqueous emulsions (latices) which can be conveniently employed in formulating the compositions of this invention. Such latices generally contain between about 50% and about 60% by weight of ethylene vinylacetate copolymer in which the ethylene content varies from about 10 to 25% and the vinylacetate content varies from about 25 to 90% randomly distributed in the copolymer chain. This copolymer is uniformly dispersed in water. Advantageously, the copolymers employed will have a low molar ratio of ethylene to vinylacetate and the free monomer content of vinylacetate in the copolymer will be less than 1%, preferably about 0.5% by weight. Generally speaking, the copolymer emulsions have the following properties:

| | |
|---|---|
| Total solids content | Minimum of 55% by weight. |
| Ratio of ethylene to vinylacetate | 85% vinylacetate: 15% ethylene. |
| Viscosity | From 100 to 600 cps. (Brookfield viscosity measured at 25° C., Model LVF, 60 r.p.m.). |
| Minimum film forming temperature (MFT) | 38° F. (4° C.). |
| Average particle size | Less than 0.3 micron. |
| pH | 4.5 to 5.7. |
| Particle charge | Non-ionic. |
| Light resistance | Excellent. |
| Mechanical stability | Excellent. |
| Heat stability | Excellent. |
| Borax tolerance | Excellent. |

Suitable latices answering the above description are commercially available in the United States and Europe for example under such tradenames as "Elvace" (E. I. du Pont de Nemours Co., Inc.), "Aircoflex" (Air Reduction Chemical and Carbide Co.), "Everflex" (Dewey and Almy Chemical Division, W. R. Grace and Co., Cambridge, Mass.), and "Vinamul" (Vinyl Products, Ltd., Carshalton, Surrey, England).

The freeze-thaw stabilizers employed in the compositions of this invention are the alkylene glycols particularly ethylene glycol, propylene glycol and hexylene glycol.

The glycol ether and glycol ether ester coalescing agents suitable for the novel compositions of this invention are preferably those having a total carbon atom content not greater than 10. Especially preferred are the mono alkyl ethers of diethylene glycol and acetates thereof. The alkyl ether groups are preferably lower alkyl ether groups. Generally speaking, the suitable acetate esters have a boiling point of 156 to 247° C. at 760 mm., and the glycol ethers a boiling point of 120° to 235° C. at the same pressure. The coalescing aids suitably employed in formulating the mastic compositions of this invention are for example: diethylene glycol monobutyl ether acetate sold commercially as Butyl Carbitol Acetate by Union Carbide Corp. and as Ektasolve DB Acetate by Eastman Chemical Co.; diethylene glycol monoethyl ether acetate sold as Carbitol Acetate by Union Carbide Corp. and as Ektasolve DE Acetate by Eastman Chemical Co.; diethylene glycol monobutyl ether available commercially as Butyl Carbitol from Union Carbide Corp., as Ektasolve DB from Eastman Chemical Co., and as Dowanol DB from Dow Chemical Company, and; diethylene glycol monomethyl ether sold as Methyl Carbitol by Union Carbide Co., as Ektasolve DM by Eastman Chemical Co. and as Dowanol DM by Dow Chemical Company.

The non-ionic surface active agent used for the general purpose mastic of this invention is an alkylaryl polyether alcohol derived from the theoretical reaction of the alkylaryl alcohol with ethylene oxide in a molar ratio of between about 1:9 ad about 1:40. Preferably, the molar ratio is about 1:40 (alcohol:ethylene oxide). In particular the non-ionic surface active agents useful for the novel mastic are derived from the reaction of t-octylphenol or nonylphenol with ethylene oxide in a molar ratio of between 1:20 and 1:40, preferably 1:40 (alcohol to ethylene oxide). The preferred surface active agent is a tertiary-octylphenoxy poly(ethyleneoxy) ethanol containing an average of 40 moles of ethylene oxide in the side chain. Suitable non-ionic surface active agents are those available commercially under the names; Triton (sold by the Rohm and Haas Company), and Igepal (sold by the GAF Company).

The reinforcing fibrous filler materials used in formulating the general purpose mastic of this invention are the acicular fillers which can be any of the natural or synthetic fibrous materials which will give inherent viscosity to the liquid mastic thereby allowing for application of the mastic in a thick wet film without sagging and sufficiently fluid to bridge rough surfaces and imparting sufficient strength to the dry film to provide the desired reinforcement. Suitable reinforcing fibrous filler are for example asbestos, nylon or other synthetic fiber flocs, glass fiber, cellulose fiber, etc.

In practice the novel mastic compositions of this invention are formulated by first preparing a stable aqueous emulsion of an ethylene vinylacetate copolymer or by selecting a commercially available latex of the type described above. When employing a commercial latex there may be present a surfactant which can be the same or different than the alkyl aryl polyether alcohols employed in formulating the mastic compositions according to this invention. In any event the presence of the non-ionic surface active agent as described above is essential to the combination which with a suitable latex and preferably ethylene glycol, propylene glycol or hexylene glycol, a coalescing agent and a fibrous filler provides a composition that is highly suitable as a vehicle for aqueous mastic coatings which are suitable and serviceable for application and drying below 0° C. In formulating the compositions of this invention the copolymer, coalescing agent, freeze-thaw stabilizer and non-ionic surface active agent must be present in the following relative amounts:

(a) 0.01 to 0.15, preferably 0.01 to 0.075 part by weight of the freeze-thaw stabilizer per part of copolymer.
(b) 0.01 to 0.12, preferably 0.01 to 0.075 part by weight of the coalescing agent per part of copolymer.
(c) 0.01 to 0.12, preferably 0.01 to 0.065 part by weight of the non-ionic surface active agent per part of copolymer.
(d) 0.05 to 0.75, preferably 0.1 to 0.25 part by weight of the fibrous filler per part of copolymer.

Satisfactory aqueous mastic coatings for particular service conditions are formulated by the addition of appropriate conventional additives. In the selection of additives those skilled in the art will be guided by the following formulation principles.

The formulations of this invention and/or the properties of the coatings formed thereby may be varied by the incorporation of any one or more of the following:

(I) Total pigment consisting of pigment and filler (in addition to the reinforcing fibrous filler specified above) in an amount between about 10 to 50% by weight of the total composition or about .2 to about 2.5 parts per part of ethylene vinylacetate based on dry weight of ethylene vinylacetate. Suitably the pigment which is preferably titanium dioxide or antimony oxide will comprise about 2 to about 8% and preferably 4 to 5% by weight of the total mastic composition and the filler material which can be a spherical or nodular filler such as calcium carbonate, clays, e.g. kaolin clays, silicates, etc. or a platey filler such as talc, mica and the like will comprise about 12 to about 48%, preferably about 15 to about 46% by weight based on total composition.
(II) Fire-retardant, preferably of the resinous chlorinated paraffinic hydrocarbon type, preferably in a concentration of from 5 to 13% by weight or about 0.1 to 0.65 part per part of ethylene vinylacetate based on dry weight of ethylene vinylacetate.

(III) Defoamer, preferably one free of silicone, in a content of from 0.1 to 0.6% or more, by weight, or about 0.002 to 0.03 part per part of ethylene vinylacetate based on dry weight of ethylene vinylacetate.

(IV) Pigment dispersant and wetting agent (over and above the amount specified as surface active agent constituting an essential ingredient for the low temperature cure system described herein), preferably in a content of from 0.3 to 1.5% by weight or about 0.006 to 0.075 part per part of ethylene vinylacetate based on dry weight of ethylene vinylacetate.

(V) Preservatives, such as fungicides or mildewcides, preferably in a content of from 0.1 to 1.0% by by weight or about 0.002 to 0.050 part per part of ethylene vinylacetate based on dry weight of ethylene vinylacetate.

(VI) Thickeners, preferably methyl cellulose or hydroxymethyl cellulose, advantageously in a content of from 0.1 to 0.5% by weight or about 0.002 to 0.025 part per part of ethylene vinylacetate based on dry weight of ethylene vinylacetate.

It is of course to be understood that when any or all of the ingredients are included in the formulations of this invention, the total content must come to 100% by weight. The selection of additives such as pigments and pigment extenders will, of course, depend on the discretion of the formulator and the end use of the formulation. Appropriate pigment and filler materials include antimony oxide, aluminum paste, colorants, calcium carbonate, talc, mica, titanium dioxide and other fillers such as magnesium silicates, clays and other absorptive minerals, etc., but these are given simply by way of illustration, not as an exhaustive list.

Adjustments to be made in selection of ingredients and in specific proportions will be readily apparent to those skilled in the art of formulating compositions. Thus for example if the content of pigments and/or extender pigments is less than specified, the coatings tend to be tacky making for the pick-up and retention of dirt. If the content exceeds the upper limit, the coatings will lack resistance to low temperatures. Moreover, when the pigment content is as specified, uniformity of color is improved when the mastic is applied within the temperature range specified. If the water content is less than specified, the coating tends to be unstable, whereas if the water content is greater than specified, the excess will not be evaporated off but will form ice crystals at low temperatures and prevent the formation of a continuous film.

The compositions of this invention may be prepared by dispersing the other ingredients into the copolymer using equipment well known in the art. The prepared compositions may be stored for periods of 18 months and longer and can be subjected to sub-zero temperatures while in storage. They can be applied to any of the substrates specified hereinbefore at from −20° C. to 50° C. and mastic coatings formed by the use thereof can satisfactorily withstand temperatures of from −46° C. to 82° C. The compositions can be applied by spray, brush or trowel. The compositions are ordinarily applied in an amount sufficient to provide a coating of between about 20 mils (0.02 inch) and about 80 mils (0.08 inch), preferably between about 60 mils (0.06 inch) and about 75 mils (0.075 inch) dry thickness.

In general the selection of additives made in accordance with the foregoing considerations will be such that when blended into the latex emulsion composition containing a freeze-thaw stabilizer, coalescing agent, non-ionic surface active agent and fibrous filler as described above the blended composition will demonstrate properties required for a rating of class 4 in the following test.

In the test method, the latex emulsion was first blended with a compatible thickening aid and additive under investigation. The addition of sufficient thickening aid to the very fluid latices was necessary to cast wet film of the thickness of 25 mils (0.025 inch) as required for mastic coatings. These films were cast over an appropriate substrate (e.g. polyethylene film) and immediately exposed to −12° C. for 96 hours. The resulting film was then examined at once at a magnification of ×200 observing for the following physical appearance categories:

(1) Discontinuous: The film was powdery and had no strength. It did not form a continuous film.
(2) Semi-continuous: The film formed was only partly continuous due to cracks caused by ice crystal patterns formed when the aqueous phase froze solid.
(3) Continuous—opaque: Incomplete coalescence occurred and the coagulated polymer particles developed some adhesion at the interface between the particles to form a weak but continuous film. This was evident by the large particle size (50 to 200 microns) of coagulated particles in the dry film.
(4) Continuous—clear: The dry film was clear, continuous, free of cracks with no evidence of coagulation present when viewed under the microscope.

Using a latex composition and additive mixture which falls by the foregoing test into class 4, a satisfactory aqueous mastic coating will generally have the following composition:

(a) an ethylene/vinylacetate copolymer in a concentration of from about 24 to about 38% by weight;
(b) a freeze-thaw stabilizer in a concentration of from about ½ to about 3% by weight, or about 0.015 to about 0.125 part per part of ethylene vinylacetate;
(c) a coalescing agent in a concentration of from about ½ to about 2½% by weight, or about 0.013 to about 0.1 part per part of ethylene vinylacetate;
(d) a non-ionic surface active agent in a concentration of from about ½ to about 2% by weight, or about 0.013 to about 0.08 part per part of ethylene vinylacetate;
(e) fibrous filler in a concentration greater than 4% by weight, generally between about 4 and 10% by weight or about 0.1 to 0.25 part per part of ethylene vinylacetate;
(f) pigment and non-fibrous fillers in a concentration of from about 15 to about 45% by weight, or about 0.35 to about 2.0 parts per part of ethylene vinylacetate;
(g) pigment dispersant and wetting agent, in excess of the amount specified as non-ionic surface active agent in (d) above, in a concentration of about 0.5 to about 3% by weight or about 0.013 to about 0.1 part per part of ethylene vinylacetate copolymer;
(h) water in a concentration of no more than 35% by weight and for practical considerations in excess of about 10% by weight, or about 0.5 to about 1.5 parts per part of ethylene vinylacetate with the proviso that the concentration of all the ingredients totals 100% by weight.

While the exact amount of ethylene vinylacetate copolymer in the mastic compositions of this invention is not critical, compositions having the use and serviceability requirements defined herein will contain at least about 20% by weight of ethylene vinylacetate copolymer based on dry weight of copolymer and preferred embodiments will contain at least about 25 to 35% by weight preferably the total amount of copolymer is between about 20% and about 50% by weight of the total weight of the mastic compositions. The total solids content of the mastic composition will in all cases exceed 65% by weight and the water content will not exceed 35% by weight of the total composition and generally the total volatiles content will not exceed 35% so that the water content will generally not exceed 30% by weight. The amount of pigment and filler materials will vary depending upon other optional ingredients and the amount of copolymer though in all cases sufficient pigment and filler is added to provide a minimum viscosity of about 30,000 centipoises. The upper limit of viscosity is governed only by the practical considerations of having the material sufficiently fluid for proper application and can ordinarily be as high as 55,000 centipoises though more viscous material of 100,000 centipoises or greater can also be prepared for particular applications.

The new general purpose mastic can be successfully applied at low ambient temperatures and to surfaces which are below freezing. Furthermore, freshly applied mastic can be exposed to sub-zero temperatures without any significant deterioration in protective properties. Table I indicates the toughness index of representative prior art polyvinylacetate mastics and a general purpose ethylene vinylacetate mastic formulated according to the above description or any of the specific examples hereinbelow. After completion of cure at room temperature, the general purpose mastic retained substantially its original tensile strength and elongation, whereas the commercial PVA mastics showed significant changes in tensile strength and toughness index, reflecting the adverse effects of exposure to freezing while uncured.

A major difference in the behavior of the new general purpose mastic when subjected to freezing after application, compared with the PVA mastics of the prior art is that setting of the general purpose mastic proceeded even at the below freezing temperatures. The PVA mastics remained frozen and did not show any degree of curing, but only the disorientation caused by the disruption of film coalescence. The general purpose mastic did solidify while below freezing, but it continued to cure and did not re-liquefy when the specimens were returned to room temperature.

Data for comparison were obtained by the methods of ASTM Designation D638–64T. Measurements were made on specimens prepared at ⅛ inch wet film thickness by the procedure of ASTM C419–65 with films from water-base mastics being cast upon rigid polyethylene sheet plastic instead of on dextrin coated paper.

| Ingredient/content (percent by weight) | Example I | II | III | IV |
|---|---|---|---|---|
| (a) Copolymer | 34.99 | 31.39 | 29.95 | 34.27 |
| (b) Freeze-thaw stabilizer | 1.05 | 0.95 | 0.90 | 1.55 |
| (c) Coalescing agent | 1.59 | 1.42 | 1.36 | 2.07 |
| (d) Non-ionic surface active agent | 1.06 | 0.95 | 0.90 | 1.55 |
| (e) Pigments: | | | | |
| TiO₂ | 4.21 | 3.77 | 3.60 | 4.12 |
| Calcium carbonate | 19.71 | 27.97 | 31.28 | 19.30 |
| Asbestos | 6.97 | 6.26 | 5.97 | 6.83 |
| (f) Water | 28.62 | 25.68 | 24.50 | 28.04 |
| (g) Pigment dispersant | 1.06 | 0.95 | 0.91 | 1.55 |
| (h) Defoamer | 0.21 | 0.19 | 0.18 | 0.20 |
| (j) Fungicide | 0.53 | 0.47 | 0.45 | 0.52 |
| Total | 100.00 | 100.00 | 100.00 | 100.00 |

| | V | VI | VII | VIII |
|---|---|---|---|---|
| (a) Copolymer | 31.28 | 28.38 | 27.28 | 30.71 |
| (b) Freeze-thaw stabilizer | 0.94 | 0.86 | 0.82 | 1.39 |
| (c) Coalescing agent | 1.42 | 1.29 | 1.23 | 1.86 |
| (d) Non-ionic surface active agent | 0.95 | 0.86 | 0.82 | 1.39 |
| (e) Total pigment and filler (including fibrous filler) | 27.63 | 34.35 | 37.00 | 27.12 |
| (f) Water | 25.60 | 23.21 | 22.28 | 25.13 |
| (g) Pigment dispersal | 0.95 | 0.86 | 0.82 | 1.39 |
| (h) Defoamer | 0.19 | 0.17 | 0.16 | 0.18 |
| (j) Fungicide | 0.47 | 0.43 | 0.41 | 0.46 |
| (k) Resinous fire-retardant | 10.57 | 9.59 | 9.18 | 10.37 |
| Total | 100.00 | 100.00 | 100.00 | 100.00 |

EXAMPLE IX

Percent by wt.

Aircoflex 500 [1] (ethylene/vinylacetate copolymer emulsion sold by Air Reduction and Carbide Co., New York, N.Y.):

Copolymer _____ 27.28
Water _____ 22.28

TABLE I.—WATER BASE MASTICS

[Stress-strain values and toughness index showing effect of below-freezing exposure during drying]

| | Tensile strength (p.s.i.) | | | Maximum strain (inches) | | | Toughness index (ergs×10⁶ per sq. in.) | |
|---|---|---|---|---|---|---|---|---|
| | Original | Cured after 96 hrs. at 10F | Percent change | Original | Cured after 96 hrs. at 10F | Percent change | Original | Cured after 96 hrs. at 10F |
| PVA Mastic A | 235 | 350 | +48.9 | 0.625 | 0.15 | −76.0 | 129.99 | 46.47 |
| PVA Mastic B | 350 | 490 | +40.0 | 3.50 | 1.75 | −50.0 | 1,084.21 | 758.95 |
| General purpose mastic | 185 | 200 | +8.1 | 5.75 | 5.50 | −4.4 | 941.50 | 973.58 |

The new general purpose mastic is non-flammable in the wet state, and has no flash point. After drying the flame spread index was found to be 15 for a ⅛-inch wet application on a ¼-inch asbestos-cement board tested by ASTM E162–67, Surface Flammability of Materials using a radiant Heat Energy Source.

In order that the invention may be well understood, it will now be described in non-limitative manner with reference to the following exemplary formulations. It will be apparent to those skilled in the art that the following examples are given by way of illustration only. The content of water may be increased to provide a more flowable formulation. The content of water, however, must not exceed an upper limit of about 35% by weight and conversely the minimum solids content of the mastics of this invention must be greater than 65% by weight. Traces of light color tints may be added or if a white product is desired, the sole pigment can be titanium dioxide only. Of course, the fungicide, defoamer and pigment dispersant formulations may be omitted, or a thickener such as methyl cellulose added. The formulations of Examples I to IV do not contain a fire-retardant, whereas those of Examples V to VIII do.

Ethylene glycol _____ 0.82
Butyl Carbitol acetate _____ 1.23
Triton X405 (t-octylphenol polyether alcohol surfactant sold by Rohm and Haas Co., Phila., Pa.) _____ 0.82
Key X10 (stabilized organo-tin preservative sold by Key Chemicals Corp., Miami Springs, Fla.) _ 0.41
Hodag PV 108 (defoamer sold by Hodag Chemical Corp., Chicago, Ill.) _____ 0.16
Chlorowax 70 (resinous chlorinated paraffin fire-retardant sold by Diamond Alkali Co., Cleveland, Ohio) _____ 9.18
Total pigment and fillers (asbestos, calcium carbonate, titanium dioxide, antimony oxide) _____ 37.00
Calgon T (Zn/Na hexametaphosphate used as pigment dispersant, sold by Calgon Inc., Pittsburgh, Pa.) _____ 0.82
Minimum curing temperature for satisfactory coating −12° C.

[1] The specific copolymers employed in this and the following illustrative examples are by way of illustration only and it will be readily apparent to those skilled in the art that other ethylene vinylacetate copolymers having the characteristic properties of the exemplified copolymers can be substituted therefor.

EXAMPLE X

| | Percent by wt. |
|---|---|
| Aircoflex 400 (ethylene/vinylacetate copolymer emulsion sold by Air Reduction Chemical and Carbide Co., New York, N.Y.) | 54.29 |
| Ethylene glycol | 0.98 |
| Butyl Carbitol acetate | 1.36 |
| Triton X405 (t-octylphenol polyether alcohol surfactant sold by Rohm and Haas Co., Phila., Pa.) | 0.91 |
| Key X10 (stabilized organo-tin preservative sold by Key Chemicals Corp., Miami Springs, Fla.) | 0.47 |
| Hodag PV 108 (defoamer sold by Hodag Chemical Corp., Chicago, Ill.) | 0.18 |
| Chlorowax 70 (resinous chlorinated paraffin fire-retardant sold by Diamond Alkali Co., Cleveland, Ohio) | 9.02 |
| Titanium dioxide | 3.09 |
| Antimony oxide | 1.06 |
| Calcium carbonate | 23.57 |
| Asbestos | 4.16 |
| Calgon T (Zn/Na hexametaphosphate used as pigment dispersant, sold by Calgon Inc., Pittsburgh, Pa.) | 0.91 |

Minimum curing temperature for satisfactory coating —6.7° C.

EXAMPLE XI

| | Percent by wt. |
|---|---|
| Elvace 1872 (ethylene/vinylacetate copolymer emulsion sold by Du Pont Co., Wilmington, Del.): | |
|   Copolymer | 29.85 |
|   Water | 24.42 |
| Ethylene glycol | 0.98 |
| Butyl Carbitol acetate | 1.36 |
| Triton X405 (t-octylphenol polyether alcohol surfactant sold by Rohm and Haas Co., Phila., Pa.) | 0.91 |
| Key X10 (stabilized organo-tin preservative sold by Key Chemical Corp., Miami Springs, Fla.) | 0.47 |
| Hodag PV 108 (defoamer sold by Hodag Chemical Corp., Chicago, Ill.) | 0.18 |
| Chlorowax 70 (resinous chlorinated paraffin fire-retardant sold by Diamond Alkali Co., Cleveland, Ohio) | 9.02 |
| Titanium dioxide | 3.09 |
| Antimony oxide | 1.06 |
| Calcium carbonate | 23.57 |
| Asbestos | 4.16 |
| Calgon T (Zn/Na hexametaphosphate used as pigment dispersant, sold by Calgon Inc., Pittsburgh, Pa.) | 0.91 |

Minimum curing temperature for satisfactory coating —1.11° C.

EXAMPLE XII

| | Percent by wt. |
|---|---|
| Aircoflex 500 (ethylene/vinylacetate copolymer sold by Air Reduction and Carbide Co., New York, N.Y.) | 31.39 |
| Ethylene glycol | 0.95 |
| Butyl Carbitol acetate | 1.42 |
| Triton X405 (t-octylphenol polyether alcohol surfactant sold by Rohm and Haas Co., Phila., Pa.) | 0.95 |
| Key X10 (stabilized organo-tin preservative sold by Key Chemical Corp., Miami Springs, Fla.) | 0.47 |
| Hodag PV 108 (defoamer sold by Hodag Chemical Corp., Chicago, Ill.) | 0.19 |
| Water | 25.68 |
| Total pigment and fillers (asbestos, calcium carbonate, titanium dioxide, antimony oxide) | 38.00 |
| Calgon T (Zn/Na hexametaphosphate used as pigment dispersant, sold by Calgon Inc., Pittsburgh, Pa.) | 0.95 |

Minimum curing temperature for satisfactory coating —12° C.

I claim:

1. A mastic composition consisting essentially of an aqueous dispersion of ethylene vinyl acetate copolymer in an amount between about 24 and 38% by weight, said copolymer consisting essentially of ethylene in an amount from about 10 to 25% by weight and vinyl acetate in an amount from about 25 to 90% by weight, said copolymer having uniformly blended therein: an alkylene glycol, in an amount between about .01 to about .15 part by weight per part of ethylene vinyl acetate copolymer; a coalescing aid selected from the group consisting of monoalkyl ethers of diethylene glycol and acetates thereof, in an amount between about .1 and about .12 part by weight per part of ethylene vinyl acetate copolymer; an alkyl-aryl polyether alcohol nonionic surface active agent in an amount between about .01 and about .12 part by weight per part of ethylene vinyl acetate copolymer; and a fibrous filler selected from the group consisting of asbestos, synthetic fiberfloc, glass fiber, and cellulose fiber; and wherein the amounts of water and total solids present in said mastic composition are such that the viscosity of the composition is at least 30,000 centipoises.

2. A composition according to claim 1 wherein said alkylene glycol is a member selected from the group consisting of ethylene glycol, propylene glycol and hexylene glycol; said coalescing aid is a member selected from the group consisting of diethylene glycol monomethyl ether, diethylene glycol monobutyl ether, diethylene glycol monoethyl ether acetate, and diethylene glycol monobutyl ether acetate; said alkylaryl polyether alcohol surface active agent is one derived from the reaction of t-octylphenol or nonylphenol with ethylene oxide in a molar ratio of about 1:40; and said fibrous filler is asbestos.

3. A mastic composition comprising a uniformly dispersed stable aqueous emulsion consisting essentially of: an ethylene vinyl-acetate copolymer in an amount between about 24 and about 38% by weight, said copolymer consisting essentially of from about 10 to 25% by weight of ethylene and from about 25 to about 90% by weight of vinyl acetate; and an alkylene glycol selected from the group consisting of ethylene glycol, propylene glycol and hexylene glycol in an amount between about 0.01 and 0.15 part by weight per part of ethylene vinyl-acetate copolymer; a coalescing aid selected from the group consisting of diethylene glycol monobutyl ether acetate, diethylene glycol monoethyl ether acetate, diethylene glycol monobutyl ether, and diethylene glycol monomethyl ether in an amount between about 0.01 and about 0.12 part by weight per part of ethylene vinyl-acetate copolymer; an alkylaryl polyether alcohol non-ionic surface active agent derived from the reaction of t-octylphenol or nonylphenol with ethylene oxide in a molar ratio of about 1:40, in an amount between about 0.01 and about 0.12 part by weight per part of ethylene vinylacetate copolymer; and an asbestos filler in an amount between about 0.05 and about 0.75 part by weight per part of copolymer; such that the total solids content of said mastic is greater than 65% by weight.

References Cited

UNITED STATES PATENTS

| | | | |
|---|---|---|---|
| 2,389,460 | 11/1945 | Rinehart | 260—41 A |
| 3,106,486 | 10/1963 | Harren et al. | 260—29.6 ME |
| 3,112,282 | 11/1963 | Jones et al. | 260—29.6 ME |
| 3,150,110 | 9/1964 | Becker et al. | 260—29.6 ME |
| 3,151,093 | 9/1964 | McNay et al. | 260—29.6 ME |
| 3,287,290 | 11/1966 | Bray | 260—29.6 ME |
| 3,355,322 | 11/1967 | Worrall et al. | 260—29.6 ME |

WILLIAM H. SHORT, Primary Examiner

L. M. PHYNES, Assistant Examiner

U.S. Cl. X.R.

260—17 R, 17.4 R, 41 B, C, AG, 87.3, 29.6 R

UNITED STATES PATENT OFFICE
CERTIFICATE OF CORRECTION

Patent No. 3,746,679      Dated July 17, 1973

Inventor(s) John Joseph Seipel, Jr.

It is certified that error appears in the above-identified patent and that said Letters Patent are hereby corrected as shown below:

Column 1, the patentee, "John Joseph Seipel, Jr., 346 Euclid Ave., Ambler, Pa. 19002" should read
-- John Joseph Seipel, Jr.,
Ambler, Pa.,         Assignor to Amchem Products, Inc.,
Ambler, Pa. --

Signed and sealed this 26th day of March 1974.

(SEAL)
Attest:

EDWARD M. FLETCHER, JR.                C. MARSHALL DANN
Attesting Officer                      Commissioner of Patents